(12) United States Patent
Mason (10) Patent No.: US 8,534,315 B2
(45) Date of Patent: Sep. 17, 2013

(54) DIAPHRAGM ASSEMBLIES FOR USE WITH FLUID CONTROL DEVICES

(75) Inventor: James Robert Mason, Abilene, KS (US)

(73) Assignee: Fisher Controls International LLC, Marshalltown, IA (US)

( * ) Notice: Subject to any disclaimer, the term of this patent is extended or adjusted under 35 U.S.C. 154(b) by 777 days.

(21) Appl. No.: 12/122,380

(22) Filed: May 16, 2008

(65) Prior Publication Data

US 2009/0283152 A1      Nov. 19, 2009

(51) Int. Cl.
*F16K 31/126* (2006.01)

(52) U.S. Cl.
USPC .............. 137/505.3; 137/315.05; 137/505.36; 137/505.42; 92/48; 92/49; 92/109; 417/103

(58) Field of Classification Search
USPC ................... 137/315.04, 315.05, 505, 505.36, 137/505.5, 505.42; 92/48, 49, 109; 417/103
See application file for complete search history.

(56) References Cited

U.S. PATENT DOCUMENTS

| | | | | |
|---|---|---|---|---|
| 468,129 | A * | 2/1892 | Cumberbatoh | 137/505.3 |
| 1,007,451 | A * | 10/1911 | Kitts, Jr. | 251/61.3 |
| 2,116,046 | A * | 5/1938 | Schmutz | 91/384 |
| 2,879,783 | A * | 3/1959 | Taplin | 137/116.5 |
| 3,150,675 | A * | 9/1964 | Phillips | 137/85 |
| 3,461,896 | A * | 8/1969 | Holloway | 137/818 |
| 3,545,471 | A * | 12/1970 | Taplin | 137/116.5 |
| 3,926,208 | A * | 12/1975 | Hoffman | 137/484.8 |
| 4,186,649 | A * | 2/1980 | Sundstrom | 91/170 R |
| 4,245,549 | A * | 1/1981 | Hardin | 92/48 |
| 4,510,849 | A * | 4/1985 | Khramtsov et al. | 91/515 |
| 4,522,220 | A * | 6/1985 | Multrus | 137/85 |
| 4,836,092 | A * | 6/1989 | Heubner et al. | 92/48 |
| 5,492,311 | A * | 2/1996 | Kurr et al. | 267/140.13 |
| 5,595,209 | A * | 1/1997 | Atkinson et al. | 137/116.5 |

(Continued)

FOREIGN PATENT DOCUMENTS

| | | |
|---|---|---|
| DE | 2803970 A1 | 8/1979 |
| FR | 1550458 A | 12/1968 |
| JP | 03041507 A * | 2/1991 |
| JP | 05302700 A * | 11/1993 |

OTHER PUBLICATIONS

Patent Cooperation Treaty, "International Preliminary Report on Patentability," issued by the International Searching Authority in connection with related PCT application No. PCT/US2009/040308, mailed May 31, 2011 (5 pages).

(Continued)

*Primary Examiner* — Eric Keasel
*Assistant Examiner* — Minh Le
(74) *Attorney, Agent, or Firm* — Hanley, Flight and Zimmerman, LLC.

(57) ABSTRACT

Diaphragm assemblies for use with fluid control devices are described. An example diaphragm assembly includes a body defining a plurality of chambers to be fluidly coupled to an outlet pressure of a fluid control device. Each of the chambers is spaced along a stem at least partially disposed in the chambers, and the stem is to move to control a flow of fluid through the fluid control device. Additionally, the example diaphragm assembly includes a first plurality of diaphragms, each of which is disposed in a corresponding one of the chambers, and each of which is coupled to the stem to move the stem in response to the outlet pressure of the fluid control device.

23 Claims, 7 Drawing Sheets

(56) References Cited

U.S. PATENT DOCUMENTS

| | | | | |
|---|---|---|---|---|
| 6,019,121 A * | 2/2000 | Uehara | .................. | 137/116.5 |
| 6,026,850 A * | 2/2000 | Newton et al. | ............ | 137/505.41 |
| 6,328,054 B1 * | 12/2001 | Martin et al. | ............... | 137/15.17 |
| 6,554,017 B2 * | 4/2003 | Berger | .................. | 137/116.5 |
| 6,604,451 B1 * | 8/2003 | Yasuda | ............................. | 92/48 |
| 6,758,240 B2 * | 7/2004 | Gregoire | ................. | 137/505.42 |
| 7,445,021 B2 * | 11/2008 | Newton | ................... | 137/505.41 |

OTHER PUBLICATIONS

Patent Cooperation Treaty, "International Search Report," issued by the International Searching Authority in connection with related PCT application No. PCT/US2009/040308, mailed May 23, 2011 (4 pages).

Patent Cooperation Treaty, "Written Opinion of the International Searching Authority," issued by the International Searching Authority in connection with related PCT application No. PCT/US2009/040308, mailed May 23, 2011 (5 pages).

Chinese State Intellectual Property Office, "First Office Action," issued in connection with Chinese Application No. 2000980117713.3, mailed on Jan. 7, 2013, 12 pages.

* cited by examiner

DIAPHRAGM ASSEMBLIES FOR USE WITH FLUID CONTROL DEVICES

FIELD OF THE DISCLOSURE

This disclosure relates generally to diaphragm assemblies, and more specifically, to diaphragm assemblies for use with fluid control devices.

BACKGROUND

In controlling the transmission of fluids in industrial processes, etc., it is often necessary to transmit the process fluid at a relatively high pressure through portions of the distribution system or process demanding high volume or flow rate of process fluid. As the high pressure process fluid travels through the distribution system or process, the pressure of the process fluid may be reduced at one or more points to supply a lower volume of the process fluid at a lower pressure to a sub-system that uses or consumes the process fluid.

Pressure reducing fluid regulators are typically used to reduce and control the pressure of a process fluid. In general, a pressure reducing fluid regulator varies the restriction through a valve that is serially interposed in the fluid flow path. In this manner, the pressure reducing fluid regulator can control the fluid flow rate and/or pressure provided at a downstream outlet of the regulator.

Some fluid regulators are set to allow a fluid to flow through the fluid regulator until an output pressure reaches a predetermined set pressure (e.g., a maximum downstream pressure), at which time a regulator stem retracts or extends and moves a plug toward an opening to restrict fluid flow through the regulator. If the output pressure decreases below the predetermined set pressure, the regulator stem moves in an opposite direction and moves the plug away from the opening allowing increased fluid flow through the regulator.

Typically, a fluid regulator includes a biasing element (e.g., a spring), a measuring element (e.g., a diaphragm), and a restricting element (e.g., a valve plug). Different size regulators are used for different applications and include a diaphragm and a spring of varying sizes to suit the particular application. The spring has a spring rate that is typically associated with the force change per unit change of length of the spring. The diaphragm has an effective area that corresponds to the area of the diaphragm that is effective in producing a force on, for example, a regulator stem. The effective area of the diaphragm may change depending on the position of the diaphragm within the fluid regulator. Typically, a diaphragm having a larger diameter will have a larger effective area compared to the effective area of a diaphragm having a smaller diameter.

Depending on the fluid regulator operational requirements, the spring rate, and the effective diaphragm area are selected based, at least in part, on Equation 1 below.

$$PA = kX \quad \text{Equation 1}$$

Referring to Equation 1, P is the sensed pressure acting against the diaphragm, A is the effective diaphragm area (i.e., A), k is the spring rate (i.e., k), and X is the total compression of the spring. As illustrated by Equation 1, if the sensed pressure (i.e., P) and the total spring compression (i.e., X) are held constant, the effective diaphragm area is related to the spring rate such that as the effective diaphragm area is increased, the spring rate must also be increased. Likewise, as the effective diaphragm area is decreased, the spring rate must be decreased. In some applications (e.g., where limited mounting space is available), it may be desirable to decrease the diameter of the diaphragm to, for example, reduce the overall size of the regulator (e.g., width). Based on Equation 1, reducing the diaphragm area also requires decreasing the spring rate. However, decreasing the spring rate decreases the resulting force acting on, for example, the stem. In practice, using a spring that has a relatively low spring rate may cause regulator chatter (e.g., plug chatter) and decrease the overall performance of the fluid regulator.

SUMMARY

In one example, a diaphragm assembly for use with a fluid control device includes a body defining a plurality of chambers to be fluidly coupled to an outlet pressure of a fluid control device. Each of the chambers is spaced along a stem at least partially disposed in the chambers. Additionally, the stem is to move to control a flow of fluid through the fluid control device. Further, the diaphragm assembly includes a first plurality of diaphragms, each of which is disposed in a corresponding one of the chambers, and each of which is coupled to the stem to move the stem in response to the outlet pressure of the fluid control device.

In another example, a pressure regulator includes a body defining a plurality of chambers to be fluidly coupled to an outlet pressure of the pressure regulator. Each of the chambers is spaced along a stem at least partially disposed in the chambers. The stem is to move to control a flow of fluid through the pressure regulator. Additionally, the pressure regulator includes a plurality of diaphragms, each of which is disposed in a corresponding one of the chambers, and each of which is coupled to the stem to move the stem in response to the outlet pressure of the pressure regulator.

In yet another example, a fluid control device includes means for fluidly coupling a plurality of chambers, each of which at least partially surrounds a stem. Additionally, the fluid control device includes means for summing forces applied to the stem by a plurality of diaphragms disposed at different locations along the stem.

DETAILED DESCRIPTION

Certain examples are shown in the above-identified figures and described in detail below. In describing these examples, like or identical reference numbers are used to identify common or similar elements. The figures are not necessarily to scale and certain features and certain views of the figures may be shown exaggerated in scale or in schematic for clarity and/or conciseness. Additionally, several examples have been described throughout this specification. Any features from any example may be included with, a replacement for, or otherwise combined with other features from other examples.

The example fluid control device described herein uses a plurality of relatively small stacked diaphragms to provide substantially the same effective diaphragm area as some known fluid control devices (e.g., fluid regulators) that have a single diaphragm. Additionally, the example fluid control device described herein may be configured to apply substantially the same resulting force on, for example, a regulator stem as these known fluid control devices that have a single diaphragm. However, the stacked diaphragm configuration of the example fluid control device described herein provides a significantly more slender or narrow profile than these known fluid control devices. More specifically, the example fluid control device described herein can provide substantially the same effective diaphragm area and, thus, can apply substantially the same resulting force to a stem of a fluid regulator or other fluid control devices by coupling a plurality of diaphragms via a plurality of diaphragm rings to the stem, which is at least partially positioned within a plurality of chambers surrounding the diaphragms. As described in greater detail below, the diaphragms and chambers are configured in a stacked arrangement that enables the diaphragms to work cooperatively on the stem so that the forces they generate (as a result of their effective areas) are added or summed and applied to the stem. Thus, in contrast to the above-described known fluid control devices, the example fluid control device described below in connection with FIGS. 2A, 2B and 3 can provide a relatively large effective area (or stem force) in a relatively narrow or slender assembly.

Figure 1:
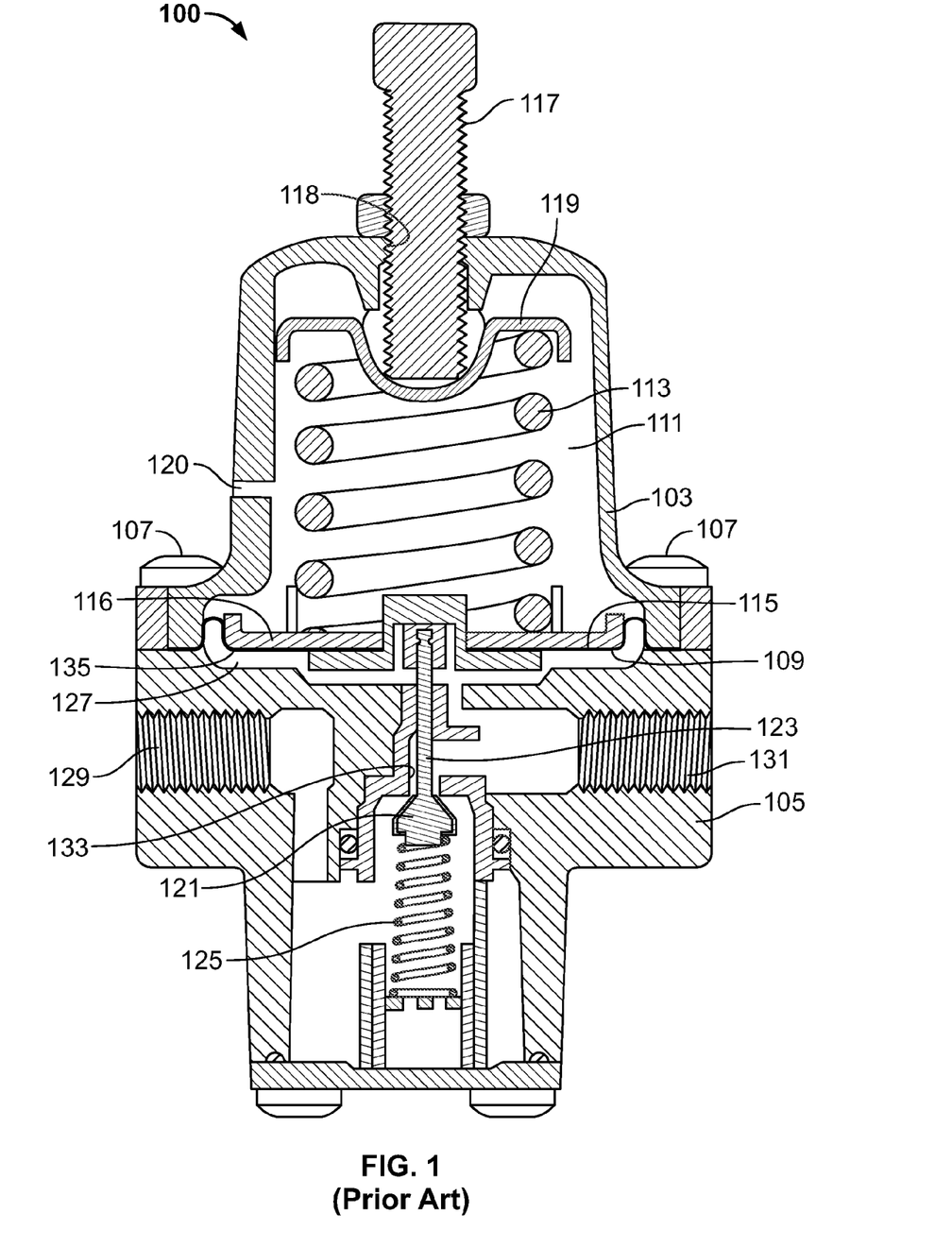
FIG. 1 depicts a cross-sectional view of a known pressure regulator.

The lower body 105 at least partially defines a second chamber 127, an inlet 129, an outlet 131, and an orifice 133. In a closed position, the valve plug 121 engages the orifice 133 and substantially stops fluid flow through the lower body 105. Further, an outlet pressure applies an upward force on a lower side 135 of the diaphragm 109. If the outlet pressure is approaching and/or equal to the set pressure, the upward force applied to the lower side 135 of the diaphragm 109 via the outlet pressure overcomes the downward force applied to the upper side 115 of the diaphragm 109 via the spring 113 and, thus, the outlet pressure moves the diaphragm 109 and the valve plug 121 up to engage the orifice 133 and substantially stop the fluid flow. Alternatively, if the outlet pressure decreases below the set pressure, the downward force applied to the upper side 115 of the diaphragm 109 via the spring 113 overcomes the upward force applied to the lower side 135 of the diaphragm 109 via the outlet pressure and the diaphragm 109 and the valve plug 121 move down to disengage the orifice 133 and allow for fluid to flow through the lower body 105 from the inlet 129 to the outlet 131.

The lower body 105 at least partially defines a second chamber 127, an inlet 129, an outlet 131, and an orifice 133. In a closed position, the valve plug 121 engages the orifice 133 and substantially stops fluid flow though the lower body 105. Further, an outlet pressure applies an upward force on a lower side 135 of the diaphragm 109. If the outlet pressure is approaching and/or equal to the set pressure, the upward force applied to the lower side 135 of the diaphragm 109 via the outlet pressure overcomes the downward force applied to the upper side 115 of the diaphragm 109 via the spring 113 and, thus, the outlet pressure moves the diaphragm 109 and the valve plug 121 up to engage the orifice 133 and substantially stop the fluid flow. Alternatively, if the outlet pressure decreases below the set pressure, the downward force applied to the upper side 115 of the diaphragm 109 via the spring 113 overcomes the upward force applied to the lower side 135 of the diaphragm 109 via the outlet pressure and the diaphragm 109 and the valve plug 121 move down to disengage the orifice 133 and allow for fluid to flow though the lower body 105 from the inlet 129 to the outlet 131.

Figure 2A:
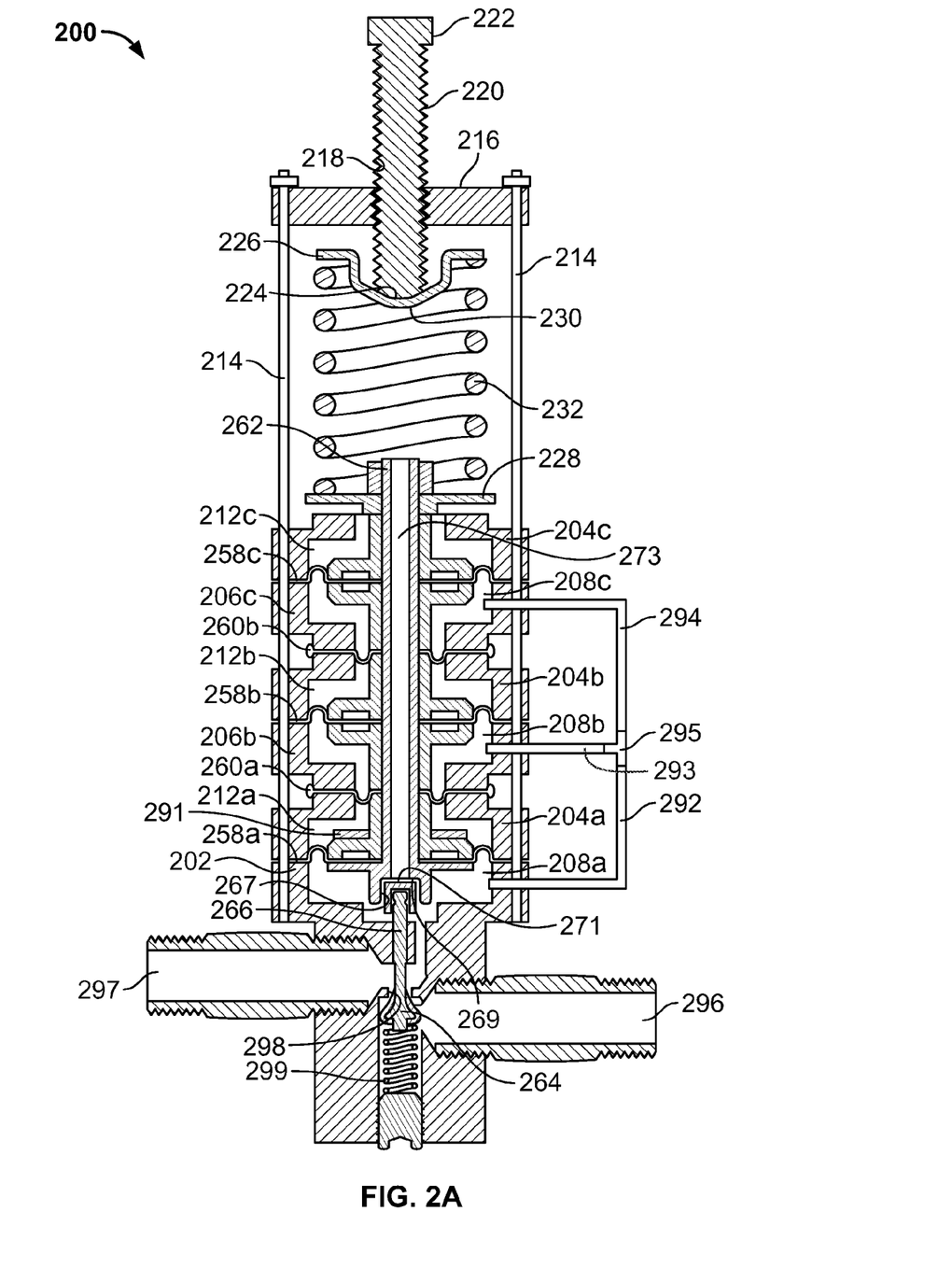
FIG. 2A depicts a cross-sectional view of an example pressure regulator.

FIG. 2A illustrates an example fluid control device 200 that includes a regulator body 202, a plurality of upper housings 204a, 204b and 204c, a plurality of lower housings 206b and 206c that define a plurality of lower chambers 208a, 208b and 208c and a plurality of upper chambers 212a, 212b and 212c. The example fluid control device 200 is depicted as a pressure regulator. However, other types of fluid control devices also may be implemented such as, for example, a valve or any other suitable fluid control device. A plurality of tie rods 214 may couple an upper plate 216, the regulator body 202, the plurality of upper housings 204, and the plurality of lower housings 206 together. The regulator body 202, the plurality of upper housings 204 and the plurality of lower housings 206 define a plurality of through holes (not shown) through which the plurality of tie rods 214 are positioned. Each of the plurality of tie rods 214 is coupled at one of its ends to the upper plate 216 and at the other of its ends to the regulator body 202. Any number of tie rods 214 (e.g., 2, 3, 4, 5, 6, etc.) may be used. Additionally, any number of upper housings 204 (e.g., 1, 2, 3, 4, etc.) and any number of lower housings 206 (e.g., 1, 2, 3, 4, 5, etc.) may be used to define any number of lower and upper chambers 208 and 212 (e.g., 2, 3, 4, 5, etc.). The regulator body 202, the plurality of upper housings 204, the plurality of lower housings 206 and the upper plate 216 may be made of any suitable material, such as, for example, a stainless steel material, or an aluminum material.

FIG. 2A illustrates an example fluid control device 200 that includes a regulator body 202, a plurality of upper housings 204a, 204b and 204c, a plurality of lower housings 206b and 206c that define a plurality of lower chambers 208a, 208b and 208c and a plurality of upper chambers 212a, 212b and 212c. The example fluid control device 200 is depicted as a pressure regulator 200. However, other types of fluid control devices also may be implemented such as, for example, a valve or any other suitable fluid control device. A plurality of tie rods 214 may couple an upper plate 216, the regulator body 202, the plurality of upper housings 204, and the plurality of lower housings 206 together. The regulator body 202, the plurality of upper housings 204 and the plurality of lower housings 206 define a plurality of through holes (not shown) though which the plurality of tie rods 214 are positioned. Each of the plurality of tie rods 214 is coupled at one of its ends to the upper plate 216 and at the other of its ends to the regulator body 202. Any number of tie rods 214 (e.g., 2, 3, 4, 5, 6, etc.) may be used. Additionally, any number of upper housings 204 (e.g., 1, 2, 3, 4, etc.) and any number of lower housings 206 (e.g., 1, 2, 3, 4, 5, etc.) may be used to define any number of lower and upper chambers 208 and 212 (e.g., 2, 3, 4, 5, etc.). The regulator body 202, the plurality of upper housings 204, the plurality of lower housings 206 and the upper plate 216 may be made of any suitable material, such as, for example, a stainless steel material, or an aluminum material.

In this example, the upper plate 216 defines a threaded aperture 218 that may be positioned substantially in the center of the upper plate 216. The threaded aperture 218 engages a threaded exterior surface 220 of an adjuster 222 that extends through the upper plate 216. The adjuster 222 may be made of any suitable material such as, for example, a stainless steel material, or a zinc plated steel material. An end 224 of the adjuster 222 engages a first spring plate 226. The first spring plate 226 is oriented opposite a second spring plate 228. The first spring plate 226 includes a spring seat 230 that orients a spring 232 that is positioned between the first and second spring plates 226 and 228.

Figure 2B:
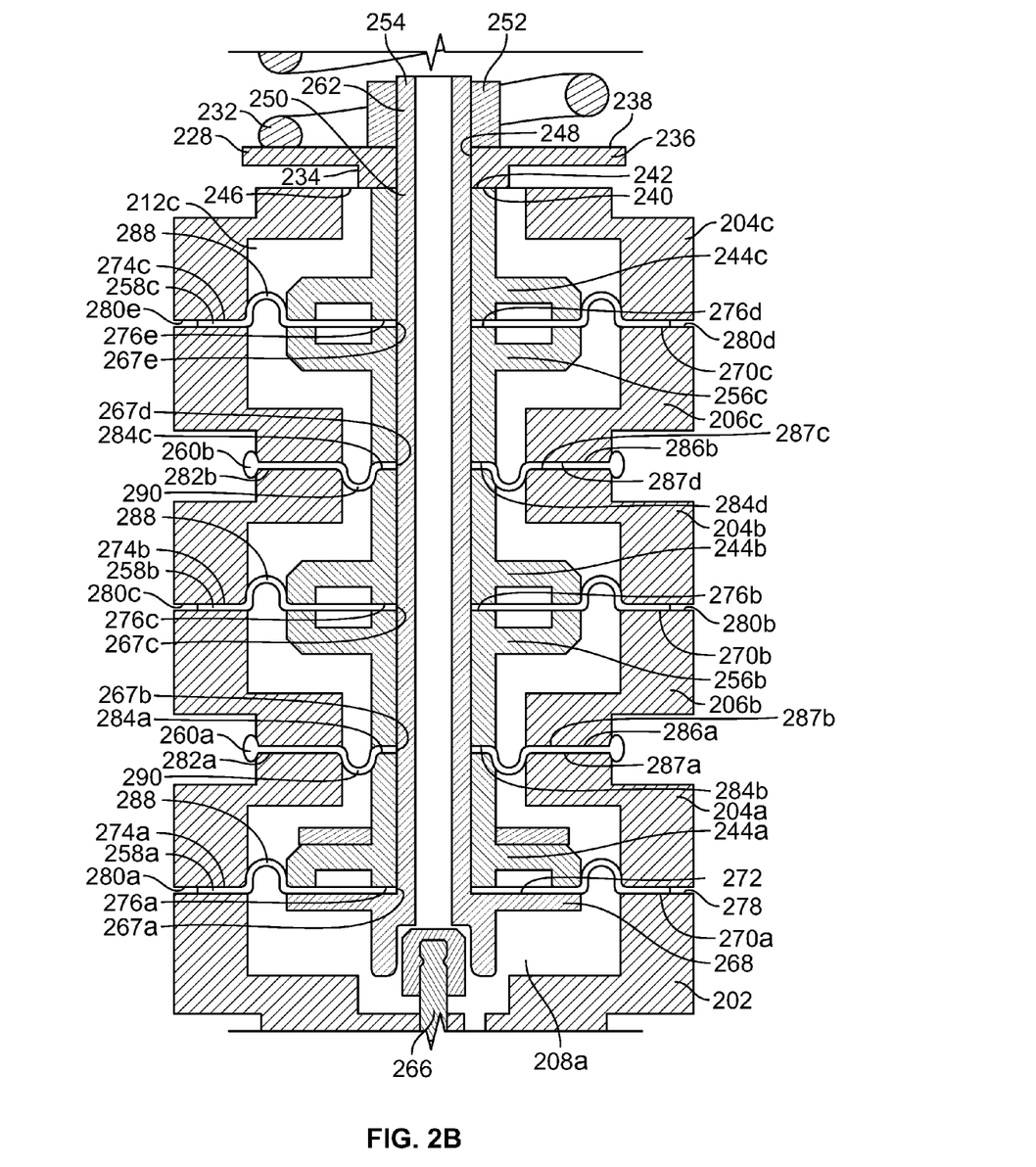
FIG. 2B depicts an enlarged view of a portion of the example pressure regulator of FIG. 2A.

Turning now to FIG. 2B, the second spring plate 228 includes a sleeve 234 and a rim 236. A surface 238 of the rim 236 is adjacent the spring 232, and a surface 240 of the sleeve 234 is adjacent a second gripping surface 242 of an upper diaphragm ring 244c. In this example, the upper chamber 212c, adjacent the second spring plate 228, is fluidly coupled to the ambient air via a opening 246 defined by the upper housing 204c and not covered by the surface 240 of the sleeve 234. The second spring plate 228 defines an aperture 248 that receives a stem body 250.

A nut 252 (e.g., a hex nut) threadably engages an end 254 of the stem body 250 to hold the second spring plate 228 between the nut 252 and the upper diaphragm ring 244c. Additionally, as discussed in more detail below, tightening the nut 252 couples the upper diaphragm rings 244c and diaphragm rings 244a and 244b, a plurality of lower diaphragm rings 256b and 256c, a plurality of first diaphragms 258a, 258b and 258c and a plurality of second diaphragms 260a and 260b to the second spring plate 228 and a stem 262. The stem 262 is operatively coupled to a plug 264 (FIG. 2A) via a regulator stem 266. The stem 262 defines an aperture 267 that includes a relief surface 269 that engages an opposite surface 271 of the regulator stem 266. Additionally, the stem 262 defines a second aperture 273 that, as discussed in more detail below, is fluidly coupled to the atmosphere to facilitate exhausting (e.g., venting) excess pressure from the outlet pressure and, thus, preventing over pressurization. The aperture 267 and the opposite surface 271 of the regulator stem 266 may comprise an elastomer plug or any other suitable engagement to substantially prevent venting of the outlet pressure if the outlet pressure is equal to or below a predetermined pressure. The upper and lower housings 204 and 206 and the lower and upper chambers 208 and 212 (FIG. 2A) at least partially surround the stem body 250.

In this example, rotating or otherwise adjusting the adjuster 222 moves the first spring plate 226 (FIG. 2A) to compress or decompress the spring 232 and, thus, changes a force applied to the stem 262 and the plug 264 (FIG. 2A). The amount of force that the spring 232 exerts on the stem 262 is associated with the set pressure of the pressure regulator 200.

The lower chambers 208 are separated from the upper chambers 212 by either the first diaphragm 258 having a first area or the second diaphragm 260 having a second area. In this example implementation, the example pressure regulator 200 includes three first diaphragms 258 and two second diaphragms 260. In other implementations, the pressure regulator 200 may have any number of first diaphragms 258 (e.g., 1, 2, 3, 4) and any number of second diaphragms 260 (e.g., 1, 2, 3, 4). The first and second diaphragms 258 and 260 define respective through holes 267a-e through which the stem body 250 passes. A diameter of the stem body 250 substantially corresponds to the through hole 267 of the first diaphragm 258 and/or the second diaphragm 260.

To couple the first and second diaphragms 258 and 260 to the stem 262, the stem 262 is provided with a rim 268, the plurality of upper diaphragms rings 244 and the plurality of lower diaphragm rings 256.

In some examples, a surface 270a of the first diaphragm 258a is adjacent a surface 272 of the rim 268, and an opposite surface 274a of the first diaphragm 258a is adjacent a first gripping surface 276a of the upper diaphragm ring 244a such that the first diaphragm 258a is positioned between the first gripping surface 276a and the surface 272 of the rim 268. Similarly, in the illustrated example, the surfaces 270b or 270c of the first diaphragms 258b and 258c are adjacent the first gripping surfaces 276b and 276b of the lower diaphragm rings 256b and 256c and the opposite surface 274b and 274c of the first diaphragms 258b and 258c are adjacent the first gripping surfaces 276c or 276e of the upper diaphragm rings 244b and 244c, respectively. The first diaphragm 258 substantially covers a first opening 708 (FIG. 7) of the upper and/or lower housings 204 and 206.

In some examples, the surface 270a of the first diaphragm 258a is adjacent a stepped portion 278 of the regulator body 202, and the opposite surface 274a of the first diaphragm 258a is adjacent a first surface 280a of the upper housing 204a such that the first diaphragm 258a is positioned between the upper housing 204a and the regulator body 202. Similarly, in the illustrated example, the surfaces 270b and 270c of the first diaphragms 258b and 258c are adjacent respective first surfaces 280b and 280d of the lower housings 206b and 206c and the opposite surfaces 274b and 274c of the first diaphragms 258 are adjacent first surfaces 280c or 280e of the upper housings 204b and 204c.

Figure 7:
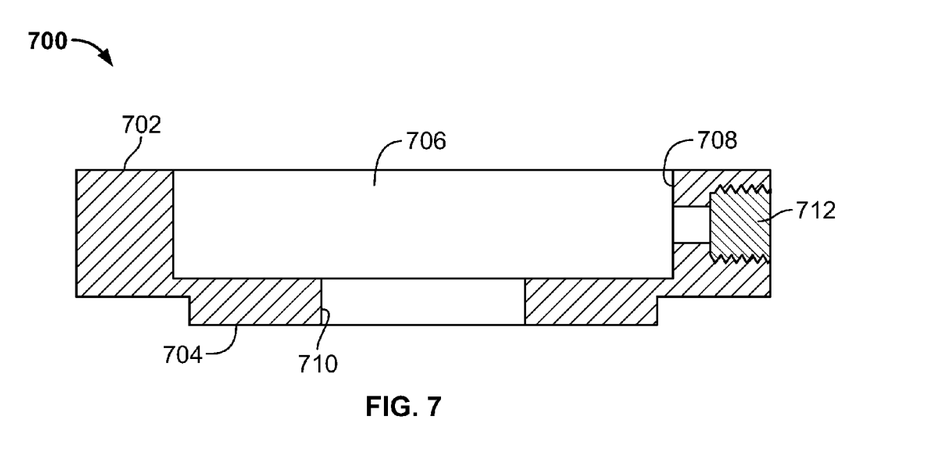
FIG. 7 depicts a cross-sectional view of an example housing that may be used to implement the example pressure regulators of FIGS. 2A, 2B and 3.

Surfaces 282a and 282b of the second diaphragms 260a and 260b are adjacent second gripping surfaces 284a and 284c of the upper diaphragm rings 244a and 244b and opposite surfaces 286a and 286b are adjacent second gripping surfaces 284b and 284d of the lower diaphragm rings 256b and 256c. Additionally, the surfaces 282a and 282b of the second diaphragms 260a and 260b are adjacent respective second surfaces 287a and 287c of the upper housings 204a and 204b and the opposite surfaces 286a and 286b of the second diaphragms 260a and 260b are adjacent second surfaces 287b and 287d of the lower housings 206b and 206c. The second diaphragm 260 substantially covers a second opening 710 (FIG. 7).

In this example, the first diaphragm 258a is initially inserted onto the stem body 250 until the surface 270a of the first diaphragm 258a is adjacent the surface 272 of the rim 268 of the stem 262. Next, the upper diaphragm ring 244a is inserted onto the stem body 250 until the first gripping surface 276a of the upper diaphragm ring 244a is adjacent the opposite surface 274a of the first diaphragm 258a. The central portion of the first diaphragm 258a is positioned between the first gripping surface 276a and the rim 268 of the stem 262 and, thus, the first diaphragm 258a creates a seal between the rim 268 and the first gripping surface 276a. Additionally, the outer portion of the surface 270a of the first diaphragm 258a is adjacent the stepped portion 278 of regulator body 202. Next, the upper housing 204a is positioned such that the outer portion of the opposite surface 274a of the first diaphragm 258a is adjacent the first surface 280a of the upper housing 204a. The outer portion of the first diaphragm 258a is positioned between the first surface 280a of the upper housing 204a and the stepped portion 278 of regulator body 202 and, thus, the first diaphragm 258a creates a seal between the first surface 280a of the upper housing 204a and the stepped portion 278 of the regulator body 202. In some examples, the example pressure regulator 200 may be provided with spacers (not shown) to ensure proper compression is applied to the outer surface of the first diaphragm 258.

Next, the second diaphragm 260a is inserted onto the stem body 250 until the surface 282a of the second diaphragm 260a is adjacent the second gripping surface 284a of the upper diaphragm ring 244a. The outer portion of the surface 282a of the second diaphragm 260a is adjacent the second surface 287a of the upper housing 204a. Next, the lower housing 206b is added to the example pressure regulator 200 and is positioned such that the outer portion of the opposite surface 286a of the second diaphragm 260a is adjacent the second surface 287b of the lower housing 206b. The outer portion of the second diaphragm 260a is positioned between the second surface 287a of the upper housing 204a and the second surface 287b of the lower housing 206b and, thus, the second diaphragm 260a creates a seal between the second surface 287a of the upper housing 204a and the second surface 287b of the lower housing 206b. In some examples, the example pressure regulator 200 may be provided with spacers (not shown) to ensure proper compression is applied to the outer surface of the second diaphragm 260.

Next, the lower diaphragm ring 256b is inserted onto the stem body 250 such that the second gripping surface 284b of the lower diaphragm ring 256b is adjacent the opposite surface 286a of the second diaphragm 260a. The central portion of the second diaphragm 260a is positioned between the second gripping surface 284b of the lower diaphragm ring 256b and the second gripping surface 284a of the upper diaphragm ring 244a and, thus, the second diaphragm 260a creates a seal between the second gripping surface 284b of the lower diaphragm ring 256b and the second gripping surface 284a of the upper diaphragm ring 244a.

In this manner, the first and second diaphragms 258 and 260, the upper and lower housings 204 and 206, and the upper and lower diaphragm rings 244 and 256 are added to the example pressure regulator 200 to attain any number of lower and upper chambers 208 and 212 (e.g., 2, 3, 4, 5). Once the desired number of first and second diaphragms 258 and 260, the upper and lower housings 204 and 206, and the upper and lower diaphragms rings 244 and 256 have been added to the example pressure regulator 200, the second diaphragm plate 228 is positioned on the stem body 250 and the nut 252 may be tightened, which couples the first and second diaphragms 258 and 260 and the upper and lower diaphragms rings 244 and 256 together allowing them to move together substantially as a single unit with the stem 262.

In this example, the second area of the second diaphragm 260 is smaller than the first area of the first diaphragm 258. In other examples, the second area is larger than the first area. The first diaphragm 258 defines a first curved section 288 (e.g., a first diaphragm convolution) that is substantially concentric with the first diaphragm 258. The first diaphragms 258 are positioned between the upper and lower housings 204 and 206 such that the first curved section 288 is in a first orientation (e.g., facing the upper plate 216). In other examples, the first diaphragms 258 are positioned between the upper and lower housings 204 and 206 such that the first curved section 288 is opposite the first orientation (e.g., facing the regulator body 202). The first diaphragms 258 may be circular in shape or may be any other suitable shape. Additionally, the first diaphragms 258 may be a molded diaphragm or any other type of suitable diaphragm.

The second diaphragm 260 defines a second curved section 290 (e.g., a second diaphragm convolution) that is substantially concentric with the second diaphragm 260. The second diaphragms 260 are positioned within the pressure regulator 200 such that the second curved section 290 is in a second orientation (e.g., facing the plug 264 (FIG. 2A)). In other examples, the second diaphragms 260 are positioned within the example pressure regulator 200 such that the second curved section 290 is opposite the second orientation (e.g., facing the upper plate 216). The second diaphragms 260 may be circular in shape or may be any other suitable shape. Additionally, the second diaphragms 260 may be a molded diaphragm or any other type of suitable diaphragm.

The orientation of the first diaphragms 258 and the second diaphragms 260 relative to an atmospheric pressure and an outlet pressure of the pressure regulator 200 is such that each of the first diaphragms 258 applies a first force to the stem 262 via the upper and lower diaphragm rings 244 and 256 and each of the second diaphragms 260 apply a second force to the stem 262 that is opposite the first force via the upper and lower diaphragm rings 244 and 256. The resulting force that is applied to the stem 262 is the summation of the forces applied by each of the first diaphragms 258 and each of the second diaphragms 260. Additionally, the total effective diaphragm area of the example pressure regulator 200 is a summation of the effective diaphragm areas of each of the first diaphragms 258 and each of the second diaphragms 260 in a particular direction. As discussed above, the resulting force applied to the stem 262 in a given direction is associated with a summation of the effective diaphragm area multiplied by the sensed pressure acting against the diaphragm.

Turning back to FIG. 2A, the lower chambers 208 are fluidly coupled to the outlet pressure of the pressure regulator 200 via a plurality of hoses or lines 292, 293 and 294. The first line 292 is fluidly coupled at an end to the lower chamber 208a of the regulator body 202 and at another end to a first coupling on a T-connector 295. The second line 293 is fluidly coupled at one end to the lower chamber 208b of the lower housings 206b and at another end to a second coupling on the T-connector 295. The third line 294 is fluidly coupled at an end to the lower chamber 208c of the lower housings 206c and at another end to a third coupling on the T-connector 295. All of the lower chambers 208 may be fluidly coupled to the output pressure of the example pressure regulator 200 in any other suitable manner such as, for example, a plurality of fluidly coupled channels or passages that may be defined by each of the housings. As the outlet pressure of the pressure regulator 200 changes, the pressure within the lower chambers 208 also changes.

The upper chambers 212 are fluidly coupled to the ambient air (e.g., atmospheric air) via a second aperture 712 (FIG. 7) defined by the upper housings 204 and/or the opening 246 (FIG. 2B). In this example, the atmospheric pressure may be used as a reference pressure. The upper chambers 212 may be fluidly coupled to the atmospheric (e.g., ambient) air by any other suitable method. Though the T-connector 295 is used in this example, any other type of suitable means may be used to couple the first, second and third lines 292, 293 and 294 together.

The regulator body 202 defines an inlet 296, an outlet 297, and an orifice 298. In the closed position, the plug 264 engages the orifice 298 and substantially stops fluid flow through the regulator body 202. A second spring 299 is disposed in the regulator body 202 below the plug 264 and exerts an upward force on the plug 264. The spring rate of the second spring 299 is substantially smaller relative to the spring rate of the spring 232.

The outlet pressure (e.g., down stream pressure) applies a force to the surface 270 (FIG. 2B) of each of the first diaphragms 258 towards the upper plate 216 and a force to the opposite surface 286 (FIG. 2B) of each of the second diaphragms 260 towards the plug 264. As discussed above, the amount of force that is applied to the stem 262 is the product of the sensed pressure acting against the first and second diaphragms 258 and 260 multiplied by the effective diaphragm area of the respective diaphragms. The effective diaphragm area of each of the first and second diaphragms 258 and 260 may be smaller than the entire area of the first and second diaphragms 258 and 260 and the effective diaphragm area may change depending on the position of the first and second diaphragms 258 and 260 within the pressure regulator 200. Alternatively, the effective diaphragm area may be substantially equal to the area of the entire diaphragm. In this example implementation, the pressure applied to both the first and second diaphragms 258 and 260 may be substantially the same. However, because the first area is larger than the second area, the force applied to the stem 262 by the each of the first diaphragms 258 via the upper and lower diaphragm rings 244 and 256 (FIG. 2B) may be larger than the force applied to the stem 262 by each of the second diaphragms 260 via the upper and lower diaphragm rings 244 and 256 (FIG. 2B).

In this example implementation, if the outlet pressure is approaching and/or equal to the set pressure, the force applied to the stem 262 via the first diaphragms 258 overcomes an opposite force applied to the stem 262 via the spring 232 and the second diaphragms 260 and, thus, the stem 262 moves the plug 264 toward the orifice 298 to reduce or substantially stop the fluid flow through the pressure regulator 200. Additionally, as the stem 262 moves toward the upper plate 216, the relief surface 269 of the stem 262 may disengage the opposite surface 271 of the regulator stem 266 enabling a portion of the outlet pressure to exhaust (e.g., vent) to the atmosphere via the second aperture 273 and, thus, substantially preventing over pressurization of the outlet pressure and/or maintaining the outlet pressure equal to or below the predetermined pressure. The stem 262 is provided with a washer or spacer 291 to substantially limit the travel of the stem 262 relative to the regulator stem 266 and/or to substantially prevent damage to the first and/or second diaphragms 258 and 260 as a result of over travel of the stem 262. If the relief surface 269 of the stem 262 disengages the opposite surface 271 of the regulator stem 266, the washer or spacer 291 may engage a portion of the upper housing 204a and substantially stop the travel of the stem 262 towards the upper plate 216. Alternatively, if the outlet pressure decreases below the set pressure, the downward force applied to the stem 262 via the spring 232 and the second diaphragms 260 overcome the upward force applied to the stem 262 via the first diaphragms 258 and, thus, the stem 262 moves the plug 264 away from the orifice 298 and allows for increased fluid flow through the regulator body 202. When the stem 262 moves, the second spring plate 228, the upper and lower diaphragm rings 244 and 256 (FIG. 2B) and the first and second diaphragms 258 and 260 move along with the stem 262. Additionally, even though the outer portion of the first and second diaphragms 258 and 260 are coupled between the upper and lower housings 204 and 206, as the stem 262 moves, the first and second diaphragms 258 and 260 move along with the stem 262 due to the flexibility of the first and second curved sections 288 and 290 (FIG. 2B) and because the first and second diaphragms 258 and 260 may be made of an elastic material such as, for example, rubber, rubber coated fabric or any other suitable material.

Figure 3:
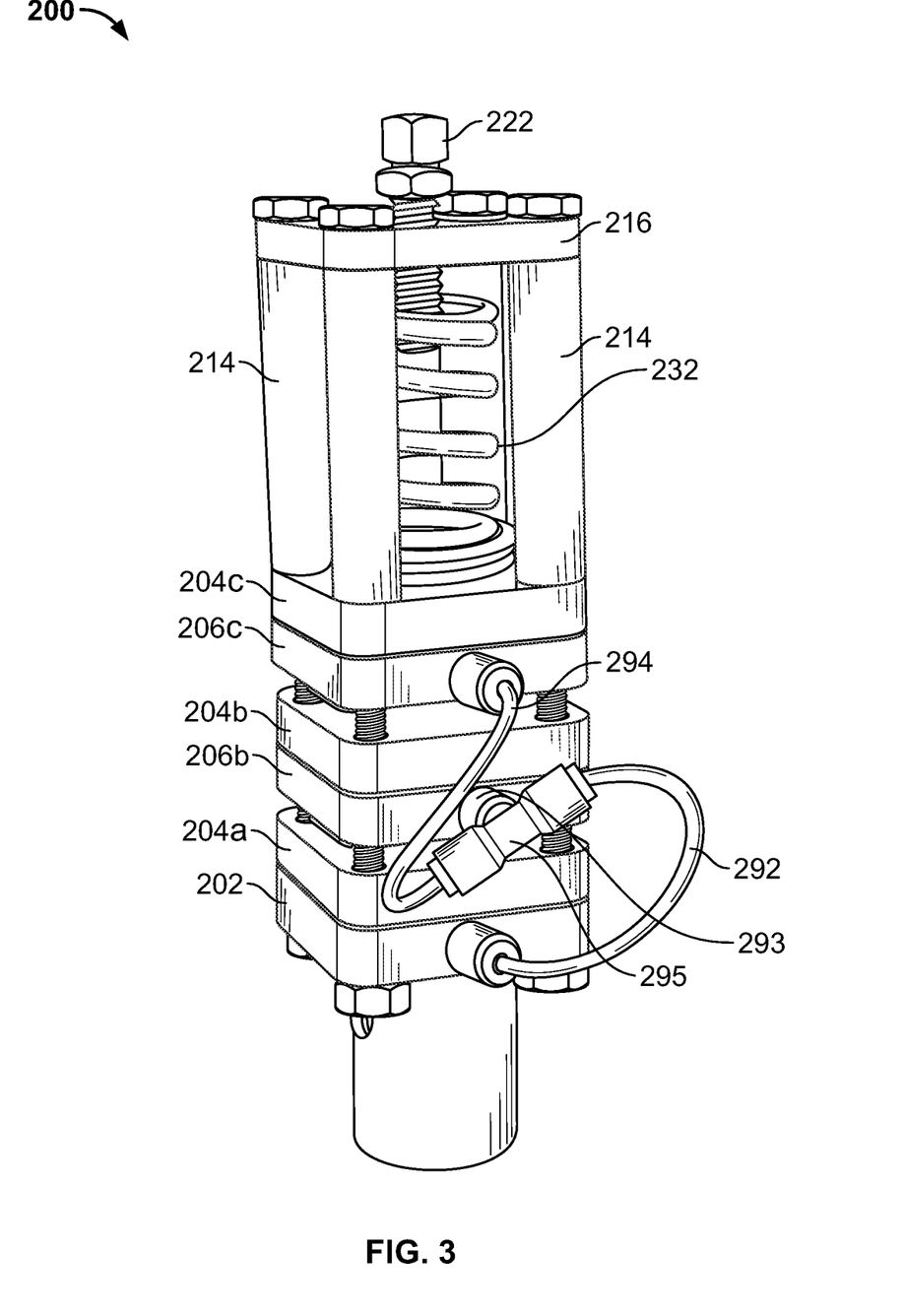
FIG. 3 depicts an isometric view of the example pressure regulator of FIGS. 2A and 2B.

FIG. 3 depicts the relationship between regulator body 202, the upper plate 216, the plurality of tie rods 214, the plurality of upper and lower housings 204 and 206, the spring 232, the adjuster 222, the first, second and third lines 292, 293 and 294, and the T-connector 295. Other examples may have any number of upper and lower housings (e.g., 2, 3, 4, 5, etc.) that may be fluidly coupled to the outlet pressure by any suitable manner. The spring 232 may be implemented using a single coil spring, though any suitable spring(s) such as, for example, a plurality of coil springs in a parallel arrangement, a plurality of coil springs in a nested-spring arrangement, etc. may be used instead. In other examples, the adjuster 222 may be provided with a hand wheel (not shown) to assist in rotating the adjuster 222 to compress or decompress the spring 232 and/or to change the position of the first spring plate 226 (FIG. 2A) within the pressure regulator 200. Additionally, the example pressure regulator 200 may be implemented in a direct-acting pressure regulator in which the regulator stem 266 (FIG. 2A) extends with increasing down stream outlet pressure, as well as a reverse-acting fluid regulator.

Figure 4:
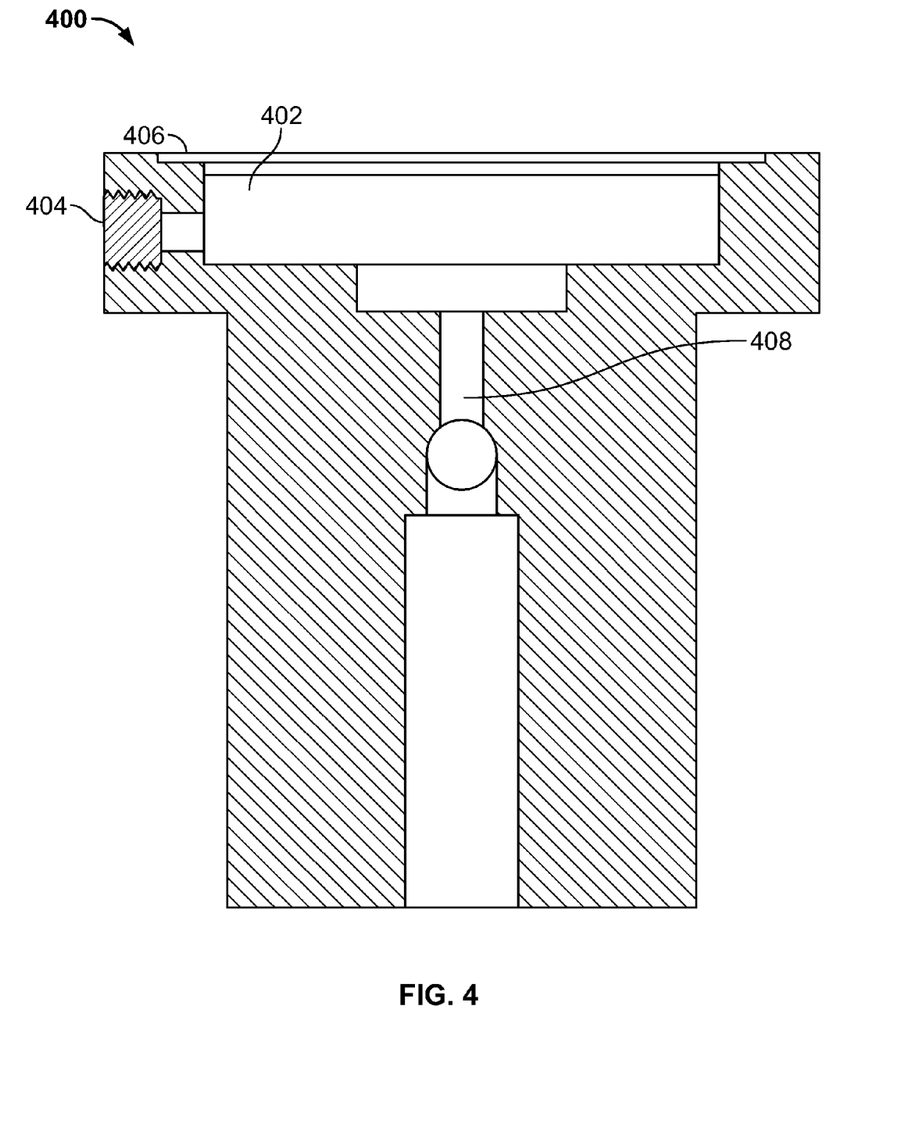
FIG. 4 depicts a cross-sectional view of an example regulator body that may be used to implement the example pressure regulator of FIGS. 2A, 2B and 3.

The example of FIG. 4 depicts an example regulator body 400 that may be used to implement the regulator body 202 (FIGS. 2A, 2B and 3). The example regulator body 400 defines a lower chamber 402, a first aperture 404 and a stepped portion 406. Additionally, the regulator body 400 defines a second aperture 408 that receives the regulator stem 266 (FIGS. 2A and B). The first aperture 404 may be fluidly coupled to the lower housing 206 (FIGS. 2A and 2B), an outlet pressure of the example pressure regulator 200 (FIGS. 2A, 2B and 3), to an atmospheric pressure or to any other suitable pressure via, for example, the first line 292 (FIG. 3).

The stepped portion 406 may include ridges or any other suitable means to assist in gripping an outer portion of the first diaphragm 258 (FIGS. 2A and 2B) at least partially positioned adjacent the stepped portion 406.

Figure 5:
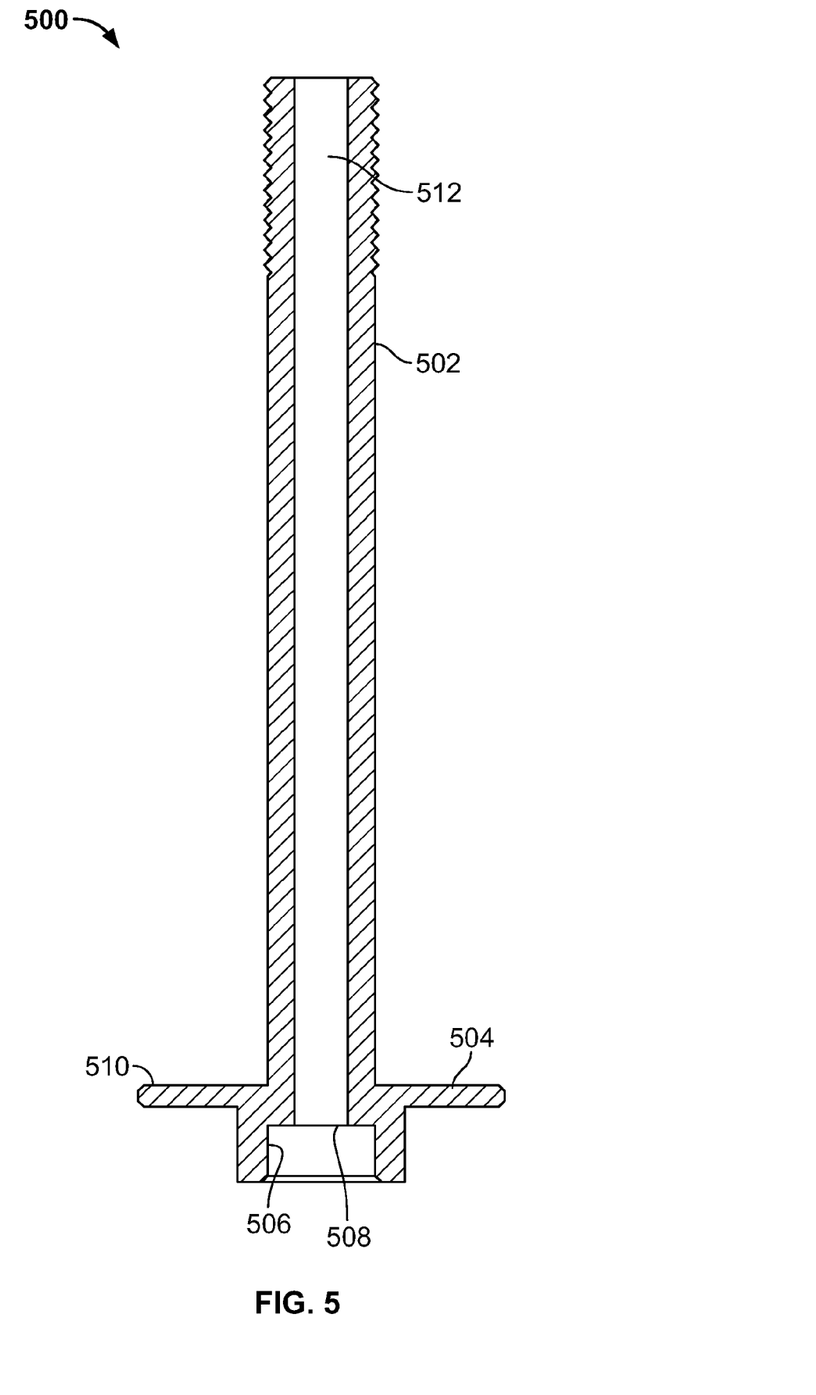
FIG. 5 depicts a cross-sectional view of an example stem that may be used to implement the example pressure regulator of FIGS. 2A, 2B and 3.

The example of FIG. 5 depicts an example stem 500 that may be used to implement the stem 262 (FIGS. 2A and 2B). The example stem 500 includes a stem body 502, a rim 504 and an aperture 506 that receives the stem 262 (FIGS. 2A and 2B). The aperture 506 includes a relief surface 508 that corresponds to the opposite surface 217 (FIG. 2A) of the regulator stem 266 (FIG. 2A). As discussed above, the stem body 502 receives the plurality of first diaphragms 258 (FIGS. 2A and 2B), the plurality of second diaphragms 260 (FIGS. 2A and 2B), and the plurality of upper and lower diaphragm rings 244 and 256 (FIG. 2B) in a substantially stacked arrangement. A surface 510 of the rim 504 may include ridges (not shown) or any other suitable means to assist in gripping a central portion of the first diaphragm 258 (FIGS. 2A and 2B). Additionally, as discussed above, the stem 500 defines a second aperture 512 that may, if the outlet pressure increases above the predetermined pressure, facilitate exhausting a portion of the outlet pressure to the atmosphere.

Figure 6:
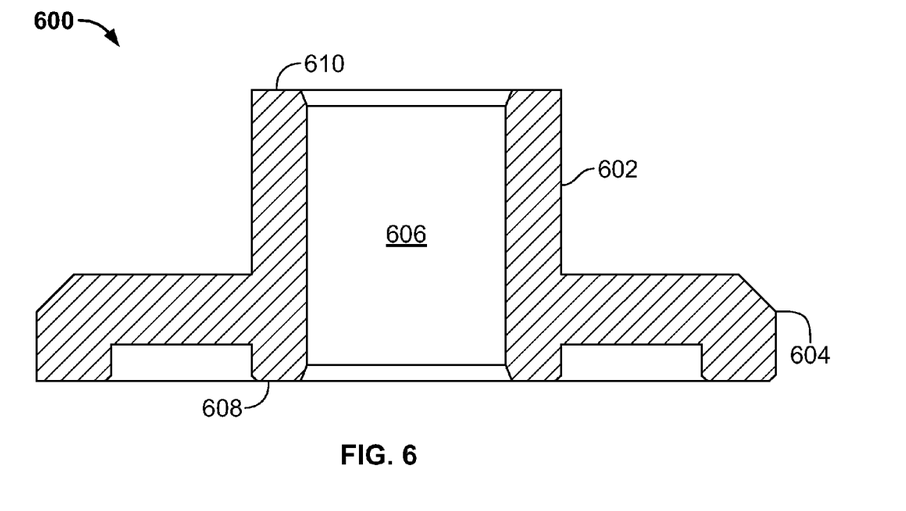
FIG. 6 depicts a cross-sectional view of an example diaphragm ring that may be used to implement the example pressure regulator of FIGS. 2A, 2B and 3.

The example of FIG. 6 depicts an example diaphragm ring 600 that may be used to implement the upper and/or lower diaphragm rings 244 and 256 (FIG. 2B). As described above, the diaphragm ring 600 is to be positioned opposite another diaphragm ring 600 along the stem body 250 (FIGS. 2A and 2B). The example diaphragm ring 600 includes a sleeve 602 and a rim 604. Additionally, the diaphragm ring 600 defines an aperture 606 in which the stem body 250 (FIGS. 2A and 2B) is positioned. The diaphragm ring 600 includes gripping surfaces (e.g., a first gripping surface 608 and a second gripping surface 610) that may include ridges or any other suitable means to assist in gripping a central portion of the first or the second diaphragms 258 and 260 (FIGS. 2A and 2B). As discussed above, the first and second diaphragms 258 and 260 (FIGS. 2A and 2B) are positioned between the first and second gripping surfaces 608 and 610, respectively, or between the rim 504 (FIG. 5) and the first gripping surface 608.

FIG. 7 depicts an example housing 700 that may be used to implement the upper and/or lower housings 204 and 206 (FIGS. 2A, 2B and 3). The example housing 700 includes a first surface 702 and a second surface 704 that may include grooves or any other suitable means to assist in gripping the outer portion of the first or second diaphragms 258 and 260 (FIGS. 2A and 2B). The housings 700 are stacked opposite one another such that the first surfaces 702 are adjacent one another and the second surfaces 704 are adjacent one another. The example housing 700 defines an aperture 706, the first opening 708 and the second opening 710. Additionally, the housing 700 defines the second aperture 712, which may be fluidly coupled to an outlet pressure of the example pressure regulator 200, to an atmospheric pressure, to the upper and/or lower housing 204 and 206 (FIGS. 2A and 2B) or to any other suitable pressure via, for example, the second or third lines 293 and 294.

The example fluid control device described herein reduces the overall width of the fluid regulator, without reducing the total effective diaphragm area and without reducing the resulting force applied to the stem. As a result, the example fluid control device reduces and/or eliminates regulator chatter that is typically associated with springs that have a relatively low spring rate and/or known fluid regulators that include a diaphragm with a relatively small diameter. Reducing the diameter of the fluid control device may allow for the example fluid control device to be used in applications in which it was not previously feasible because of limited available mounting space.

Furthermore, although certain example methods, apparatus and articles of manufacture have been described herein, the scope of coverage of this patent is not limited thereto. On the contrary, this patent covers all methods, apparatus and articles of manufacture fairly falling within the scope of the appended claims either literally or under the doctrine of equivalents.

What is claimed is:

1. A diaphragm assembly for use with a fluid control device, comprising:
    a plurality of housings to be coupled to a fluid control device to define a plurality of chambers, the chambers to comprise a first portion and a second portion, the first portion to be fluidly coupled to an outlet pressure of the fluid control device;
    tie rods to extend through the housings to couple the housings to the fluid control device;
    a stem defining an aperture therethrough and a seating surface adjacent an end of the stem, the seating surface to be removably engaged by a valve stem to enable an overpressure to vent through the aperture to the atmosphere, wherein each of the chambers is spaced along the stem which is at least partially disposed in the chambers, and wherein the stem is to move to control a flow of fluid through the fluid control device;
    a plurality of diaphragm rings to surround and be operatively coupled to the stem, wherein the diaphragm rings comprises a sleeve and a rim, each sleeve defining an aperture through which the stem is to extend and each rim comprising a portion extending substantially perpendicularly from the sleeve; and
    a plurality of first diaphragms to separate the first and second portions, each of the first diaphragms is disposed in a corresponding one of the chambers and which is coupled to the stem to move the stem in response to the outlet pressure of the fluid control device, wherein one or more of the first diaphragms is positioned between opposing first sides of the diaphragm rings, the rim comprising an annular gripping surface to seal against an adjacent first diaphragm, an annular groove is defined by each of the diaphragm rings between the annular gripping surface and the sleeve.

2. The diaphragm assembly as defined in claim 1, wherein each of the first diaphragms is to apply a first force to the stem.

3. The diaphragm assembly as defined in claim 2, wherein each of the first diaphragms has a first diaphragm area, and wherein a resulting force on the stem is associated with a sum of the first diaphragm areas.

4. The diaphragm assembly as defined in claim 3, further comprising a plurality of second diaphragms comprising a second diaphragm area relatively smaller than the first diaphragm area.

5. The diaphragm assembly as defined in claim 1, further comprising a plurality of second diaphragms, wherein each of the second diaphragms has a first size, and wherein each of the first diaphragms has a second size that is different from the first size.

6. The diaphragm assembly as defined in claim 5, wherein one or more of the second diaphragms is disposed between the chambers.

7. The diaphragm assembly as defined in claim 1, further comprising a plurality of second diaphragms, wherein each of the second diaphragms is in a first orientation and wherein each of the first diaphragms is in a second orientation that is different from the first orientation.

8. The diaphragm assembly as defined in claim 1, further comprising a second diaphragm coupled to the stem by and positioned between adjacent second sides of the diaphragm rings to separate the respective chambers, each second side comprising a gripping surface to seal against the adjacent second diaphragm.

9. A pressure regulator, comprising:
    a regulator body;
    a plurality of housings coupled to the regulator body to define a plurality of chambers, the chambers to be fluidly coupled to an outlet pressure of the pressure regulator;
    tie rods extending through the housings to couple the housings to the regulator body;
    a stem defining an aperture therethrough and a seating surface adjacent an end of the stem, the seating surface to be removably engaged by a valve stem to enable an overpressure to vent through the aperture to the atmosphere, wherein each of the chambers is spaced along the stem which is at least partially disposed in the chambers, and wherein the stem is to move to control a flow of fluid through the pressure regulator; a plurality of diaphragm rings surrounding and operatively coupled to the stem, the respective diaphragm rings comprising a sleeve and a rim, the rim comprising a first portion and an annular gripping portion, the first portion extending substantially perpendicularly from the sleeve, the annular gripping portion extending substantially perpendicularly relative to the first portion and substantially parallel to the sleeve, an annular groove is defined by the respective diaphragm rings between the annular gripping portion and the sleeve; and
    a plurality of first diaphragms, each of which is disposed in a corresponding one of the chambers, and each of which is coupled to the stem to move the stem in response to the outlet pressure of the pressure regulator, wherein one or more of the first diaphragms is positioned between opposing first sides of the diaphragm rings, each first side comprising gripping surfaces to seal against an adjacent first diaphragm.

10. The pressure regulator as defined in claim 9, wherein each of the first diaphragms is to apply a first force to the stem.

11. The pressure regulator as defined in claim 9, further comprising a plurality of second diaphragms comprising a second diaphragm area relatively smaller than the first diaphragm area.

12. The pressure regulator as defined in claim 9, further comprising a plurality of second diaphragms, wherein each of the second diaphragms has a first size, and wherein each of the first diaphragms has a second size that is different from the first size.

13. The pressure regulator as defined in claim 12, wherein one or more of the second diaphragms is disposed between the chambers.

14. The pressure regulator as defined in claim 9, further comprising a plurality of second diaphragms, wherein each of the second diaphragms is in a first orientation and wherein each of the first diaphragms is in a second orientation that is different from the first orientation.

15. The pressure regulator as defined in claim 14, wherein each of the first diaphragms is to apply a first force to the stem and wherein each of the second diaphragms is to apply a second force to the stem that is opposite the first force.

16. The pressure regulator as defined in claim 9, further comprising a second diaphragm coupled to the stem by and positioned between adjacent second sides of the diaphragm rings to separate the respective chambers, each second side comprising a gripping surface to seal against the adjacent second diaphragm.

17. A regulator, comprising:
a regulator body having an inlet and an outlet;
a plurality of housings coupled to the regulator body to define a plurality of chambers, the chambers to comprise a first portion and a second portion, the first portion to be coupled to an outlet pressure;
tie rods extending through the housings to couple the housings to the regulator body;
a stem extending through the housings to the regulator body;
a plurality of diaphragm rings surrounding and operatively coupled to the stem;
a plurality of first diaphragms to separate the first and second portions of the respective chambers, wherein one or more of the first diaphragms is positioned between opposing first sides of the diaphragm rings, each first side comprising two gripping surfaces to seal against an adjacent first diaphragm; and
a second diaphragm coupled to the stem by and positioned between adjacent second sides of the diaphragm rings to separate the respective chambers, each second side comprising a gripping surface to seal against an adjacent second diaphragm, the housings comprise a first diameter portion and a second diameter portion, the second diameter portion smaller than the first diameter portion, adjacent first diameter portions of opposing housings to seal against the adjacent first diaphragm, the second diameter portion to seal against the adjacent second diaphragm, wherein each of the diaphragm rings comprises a sleeve and a rim, the sleeve defining an aperture through which the stem is to extend and the rim comprising a first portion and an annular gripping portion, the first portion extending substantially perpendicularly from the sleeve, the annular gripping portion extending substantially perpendicularly relative to the first portion and substantially parallel to the sleeve, an annular groove is defined by the respective diaphragm rings between the annular gripping portion and the sleeve.

18. The regulator of claim 17, wherein the stem comprises an aperture therethrough and a seating surface adjacent an end of the stem, the seating surface to be removably engaged by a valve stem to enable an overpressure to vent through the aperture to the atmosphere.

19. The regulator of claim 18, wherein the stem comprises a receptacle that receives a portion of the valve stem when the valve stem engages the seating surface.

20. A pressure regulator, comprising:
a body coupled to first and second housings via tie rods, the body and the first housings to define first chamber portions and the second housings to define second chamber portions, the body comprising an inlet, an outlet, and a flow aperture to fluidly couple the inlet and the outlet;
a stem operatively coupled to a plug to control fluid flow through the flow aperture, a rim of the stem positioned in the first chamber defined by the body;
first and second diaphragms to surround the stem; and
diaphragm rings operatively coupled to the stem to transfer a load thereto, the diaphragm rings opposingly positioned in the chamber portions defined by the first and second housings, the first diaphragms positioned between first ends of the diaphragm rings and the second diaphragms positioned between second ends of the diaphragm rings, the diaphragm rings comprising a sleeve and a rim, the rim comprising a first portion and an annular gripping portion, the first portion extending substantially perpendicularly from the sleeve, the annular gripping portion extending substantially perpendicularly relative to the first portion and substantially parallel to the sleeve, the annular gripping portion to seal against the adjacent second diaphragm, an annular groove is defined by the respective diaphragm rings between the annular gripping portion and the sleeve.

21. A pressure regulator of claim 20, wherein the sleeve comprises the first end and the rim comprises the second end.

22. A pressure regulator of claim 20, further comprising a stop to limit travel of the stem.

23. A pressure regulator of claim 20, further comprising a biasing element to bias the stem, the biasing element to engage a spring seat comprising a sleeve and a rim, the rim to be movable into one of the second chamber portions.

* * * * *